UNITED STATES PATENT OFFICE 2,416,387

PROCESS FOR MAKING SULFUR-CONTAINING PHTHALOCYANINES

Norman Hulton Haddock and Clifford Wood, Blackley, Manchester, England, assignors to Imperial Chemical Industries Limited, a corporation of Great Britain No Drawing. Application June 21, 1944, Serial No. 541,456. In Great Britain July 7, 1943

7 Claims. (Cl. 260—314.5)

This invention relates to the manufacture of new sulphur-containing dyestuffs and more particularly to the manufacture of new sulphur-containing dyestuffs derived from thioamides.

We have found that by heating phthalocyanine sulphonyl chlorides with thioamides, substances are obtained which will dissolve in aqueous sodium sulphide solutions, yielding liquors which on application to cotton and subsequent oxidation yield blue and green dyeings thereon. That is to say, the products obtained by heating phthalocyanine sulphonyl chlorides with thioamides can be used for dyeing cotton by the customary technique employed in connection with sulphur dyestuffs. Besides thioamides, substituted thioamides as defined below may also be used.

Accordingly the present invention relates to a process for the manufacture of sulphur-containing dyestuffs comprising heating a metal or metal-free phthalocyanine sulphonyl chloride with a thioamide, one hydrogen atom of the amido group of which may, if desired, be replaced by an alkyl or aryl group. It will be recognized that such thioamides possess the radical

by virtue of which they can be tautomerized into the form

As examples of phthalocyanine sulphonyl chlorides which may be used in accordance with the present invention are mentioned: copper phthalocyanine tetra-(4)-sulphonyl chloride, copper phthalocyanine tri-(4)-sulphonyl chloride and metal-free phthalocyanine trisulphonyl chloride.

As thioamides there may be employed in this invention, for instance, thiobenzamide, phenyldithiobiuret, thiourea and allylthiourea. Additional instances of applicable thioamides are named in the specific examples which follow, and it will be observed that all these have the common quality of being molten at the temperature of the reaction in the presence of the other ingredients of the reaction.

The present dyestuffs yield dyeings on cotton of blue to green shades, which possess good fastness properties, particularly good fastness to wet treatment.

The following examples, in which the parts are by weight, illustrate, but do not limit, the invention.

Example 1

10 parts of copper phthalocyanine tetra-(4)-sulphonyl chloride, obtainable by heating tetrapotassium copper phthalocyanine tetra-(4)-sulphonate with phosphorus pentachloride in nitrobenzene, are heated with 40 parts of thiourea at 170–175° C. for 2 hours. The melt, which is bright green in colour, is cooled and extracted with 500 parts of boiling water. The residual green solid is then filtered off and washed with water. On drying it forms a bright green powder which dissolves in hot dilute aqueous sodium sulphide solution yielding a bluish grey solution. The latter dyes cotton in grey to black shades, which on being allowed to oxidise in the air become bright green and are of good fastness properties, particularly in respect of wet treatment.

Example 2

The 40 parts of thiourea used in Example 1 are replaced by 60 parts of thiobenzanilide. A dyestuff of similar properties to those of Example 1 is obtained.

Example 3

10 parts of metal-free phthalocyanine trisulphonyl chloride (obtainable by heating with phosphorus pentachloride in nitrobenzene trisodium metal-free phthalocyanine trisulphonate, itself got by sulphonating metal-free phthalocyanine), are heated with 50 parts of thiourea at 170–175° C. for 2 hours. The melt is then treated in the same way as in Example 1. The product is a bright yellowish green powder which dissolves in hot dilute sodium sulphide solution affording a bluish grey solution. This latter dyes cotton in bluish grey shades which change to bright yellowish green shades on oxidation in air. The shades so obtained are of good fastness properties.

Example 4

In place of the 50 parts of thiourea employed in Example 3, there are used 60 parts of phenyldithiobiuret. A new dyestuff similar to that of Example 3 is obtained.

Example 5

10 parts of metal-free phthalocyanine trisulphonyl chloride (obtainable as described in Example 3) are heated with 50 parts of N-methylthiourea at 120–125° C. for ½ hour. The melt is then treated in the same way as in Example 1. A new dyestuff of similar shade to that of Example 3 is obtained.

Example 6

In place of the 50 parts of N-methylthiourea employed in Example 5, there are used 50 parts of N:N'-dimethylthiourea. A new dyestuff of similar shade to that of Example 3 is obtained.

Example 7

In place of the 50 parts of N-methylthiourea employed in Example 5, there are used 50 parts of N-methyl-N'-dimethylthiourea. A new dyestuff of similar shade to that of Example 3 is obtained.

Example 8

10 parts of metal-free phthalocyanine trisulphonyl chloride (obtainable as described in Example 3) are heated with 50 parts of thioacetanilide at 110-115° C. for ¼ hour. The melt, which is bright green in colour, is cooled and extracted with 200 parts of boiling alcohol. The green solid in suspension is filtered off and washed three times with 50 parts of alcohol, and dried. A new dyestuff, which dyes cotton similarly to that of Example 3, is obtained.

Example 9

10 parts of metal-free phthalocyanine trisulphonyl chloride (obtainable as described in Example 3) are heated with 50 parts of thioacetamide at 130-135° C. for ¼ hour. The melt is then treated in the same way as in Example 8. A new dyestuff, which dyes cotton similarly to that of Example 3, is obtained.

Example 10

10 parts of the copper phthalocyanine polysulphonyl chloride, made as described below, are heated with 50 parts of thiourea at 170-175° C. for 1 hour. The melt is cooled and extracted with 400 parts of boiling water. The green suspension is filtered off and the residue washed three times with 100 parts of water. The product dissolves in aqueous sodium sulphide solution to a bluish grey solution, which dyes cotton in grey shades oxidising in the air to bright bluish green.

The copper phthalocyanine polysulphonyl chloride used above is made as follows: 10 parts of copper phthalocyanine are dissolved in 115 parts of 25% oleum and the mixture is heated at 70° C. for 12 hours, then for 2 hours at 85° C. The mixture is cooled and poured into 500 parts of ice and water mixed with 100 parts of salt. The precipitated blue product is filtered off and washed free from acid with 10% aqueous salt solution. It is dissolved in water and the solution made neutral by adding sodium hydroxide solution. The solution is evaporated to dryness. 10 parts of the sulphonated copper phthalocyanine so obtained are heated with 200 parts of nitrobenzene and 10 parts of phosphorus pentachloride at 100-110° C. for 2 hours. The resulting blue solution is filtered from insoluble matter. When cold, petroleum ether is added to precipitate the sulphonyl chloride, which is filtered off, washed with petroleum ether, and dried.

We claim:

1. Process for the manufacture of sulphur-containing dyestuffs comprising heating a member selected from the group consisting of metal- and metal-free phthalocyanine sulphonyl chlorides with a thioamide having at least one free hydrogen atom attached to the nitrogen atom of the thioamide radical.

2. Process for the manufacture of a sulphur-containing dyestuff comprising heating metal-free phthalocyanine trisulphonyl chloride with thiourea.

3. Process for the manufacture of vattable sulphur-containing dyestuffs of the phthalocyanine series, which comprises heating a phthalocyanine compound selected from the group consisting of metal- and metal-free phthalocyanines containing sulphonyl chloride groups, with an organic compound containing a thioamide group having at least one free hydrogen atom on the amide nitrogen, until the phthalocyanine compound has been converted into a product soluble in sodium sulfide, and recovering the color thus produced.

4. Process for the manufacture of vattable sulphur-containing dyestuffs of the phthalocyanine series, which comprises heating, at a temperature between 110 and 175° C., a phthalocyanine compound selected from the group consisting of metal- and metal-free phthalocyanines containing sulphonyl chloride groups, with an organic compound containing a thioamide group having at least one free hydrogen atom on the amide nitrogen, until the phthalocyanine compound has been converted into a product soluble in sodium sulfide, and recovering the color thus produced.

5. Process for the manufacture of vattable sulphur-containing dyestuffs of the phthalocyanine series, which comprises heating, at a temperature between 110 and 175° C., a phthalocyanine compound selected from the group consisting of metal- and metal-free phthalocyanines containing sulphonyl chloride groups, with an organic thioamide which possesses at least one free hydrogen atom on the amide nitrogen and is liquid at the selected reaction temperature, until the phthalocyanine compound has been converted into a product soluble in sodium sulfide, and recovering the color thus produced.

6. A process for the manufacture of vattable sulphur-containing dyestuffs of the phthalocyanine series, which comprises heating metal-free phthalocyanine-trisulphonyl chloride with thiourea at a temperature of about 170 to 175° C., and recovering from the melt a product which is soluble in hot aqueous sodium sulfide.

7. A process for the manufacture of vattable sulphur-containing dyestuffs of the phthalocyanine series, which comprises heating a copper-phthalocyanine-polysulphonyl chloride with thiourea at a temperature of about 170 to 175° C., and recovering from the melt a product which is soluble in hot aqueous sodium sulfide.

NORMAN HULTON HADDOCK.
CLIFFORD WOOD.

REFERENCES CITED

The following references are of record in the file of this patent:

UNITED STATES PATENTS

| Number | Name | Date |
|---|---|---|
| 2,219,330 | Nadler et al. | Oct. 29, 1940 |
| 2,300,572 | Hoyer et al. | Nov. 3, 1942 |